US012810662B2

(12) United States Patent
Shirai

(10) Patent No.: US 12,810,662 B2
(45) Date of Patent: Nov. 24, 2026

(54) DISPLAYING CONTROL APPARATUS FOR DISPLAYING ECONOMY LEVEL INFORMATION

(71) Applicant: TOYOTA JIDOSHA KABUSHIKI KAISHA, Toyota (JP)

(72) Inventor: Hayato Shirai, Tagata-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 17 days.

(21) Appl. No.: 19/024,472

(22) Filed: Jan. 16, 2025

(65) Prior Publication Data

US 2025/0259485 A1 Aug. 14, 2025

(30) Foreign Application Priority Data

Feb. 8, 2024 (JP) ................................ 2024-017857

(51) Int. Cl.

*G07C 5/06* (2006.01)
*B60W 30/165* (2020.01)
*B60W 60/00* (2020.01)

(52) U.S. Cl.

CPC ............. *G07C 5/06* (2013.01); *B60W 30/165* (2013.01); *B60W 60/001* (2020.02); *B60W 2556/40* (2020.02); *B60W 2754/30* (2020.02)

(58) Field of Classification Search

CPC ..... G07C 5/06; B60W 30/165; B60W 60/001; B60W 2556/40; B60W 2754/30; B60W 30/18072; B60W 2554/802; B60W 50/14; B60W 2050/146; B60W 30/16; B60K 35/22; B60K 35/28

See application file for complete search history.

(56) References Cited

U.S. PATENT DOCUMENTS

2014/0176321 A1* 6/2014 Chen ..................... B60W 30/14 340/435
2020/0384859 A1* 12/2020 Higuchi ................. B60K 35/81
2023/0036783 A1* 2/2023 Sakuma ............. G02B 27/0101

FOREIGN PATENT DOCUMENTS

DE 102016012465 A1 * 5/2017 .......... B60W 40/076
JP 3380497 B 2/2003
KR 20160099261 A * 8/2016 ............. B60K 35/00

* cited by examiner

*Primary Examiner* — Aniss Chad
*Assistant Examiner* — Nikki Marie M Molina
(74) *Attorney, Agent, or Firm* — Sughrue Mion, PLLC

(57) ABSTRACT

A displaying control apparatus displays an economy level image indicating an economy level acquired based on a first evaluation value until an environmental parameter reaches an increase side threshold greater than a predetermined switching threshold when the environmental parameter changes from a value equal to or smaller than the predetermined switching threshold to a value greater than the predetermined switching threshold while executing a following moving control. The apparatus displays the economy level image indicating the economy level acquired based on a second evaluation value until the environmental parameter reaches a decrease side threshold smaller than the predetermined switching threshold when the environmental parameter changes from a value greater than the predetermined switching threshold to a value equal to or smaller than the predetermined switching threshold while executing the following moving control.

4 Claims, 9 Drawing Sheets

| | | INTER-VEHICLE DISTANCE | | | |
|---|---|---|---|---|---|
| | | Rd1 | Rd2 | Rd3 | Rd4 |
| PROJECTED AREA | Ra1 | 1 | 1 | 0 | 0 |
| | Ra2 | 2 | 2 | 1 | 0 |
| | Ra3 | 3 | 2 | 2 | 1 |
| | Ra4 | 3 | 3 | 2 | 1 |

FIG.4

MapU

| | | INTER-VEHICLE DISTANCE | | | |
|---|---|---|---|---|---|
| | | Rd1 | Rd2 | Rd3 | Rd4 |
| PROJECTED AREA | Ra1 | ... | ... | ... | ... |
| | Ra2 | ... | ... | ... | ... |
| | Ra3 | 3 | 3 | 2 | ... |
| | Ra4 | ... | ... | ... | ... |

MapD

| | | INTER-VEHICLE DISTANCE | | | |
|---|---|---|---|---|---|
| | | Rd1 | Rd2 | Rd3 | Rd4 |
| PROJECTED AREA | Ra1 | ... | ... | ... | ... |
| | Ra2 | ... | ... | ... | ... |
| | Ra3 | 3 | 2 | 2 | ... |
| | Ra4 | ... | ... | ... | ... |

FIG.9

DISPLAYING CONTROL APPARATUS FOR DISPLAYING ECONOMY LEVEL INFORMATION

CROSS-REFERENCE TO RELATED APPLICATIONS

This application claims priority to Japanese patent application No. JP 2024-017857 filed on Feb. 8, 2024, the content of which is hereby incorporated by reference in its entirety.

BACKGROUND

Field

The present invention relates to a displaying control apparatus.

Description of the Related Art

There is known a displaying control apparatus which displays an economy level image indicating an economy level (i.e. a level of a low energy consumption to move an own vehicle) on a meter display. There is also known a displaying control apparatus which switches the displayed economy level image between the economy level image for the relatively great economy level and the economy level image for the relatively small level which are different. In cases where such a displaying control apparatus is configured to determine that the economy level is relatively great when a detection data detected by sensors is equal to or smaller than a threshold value, and to determine that the economy level is relatively small when an inter-vehicle distance is greater than a threshold, when the detection data frequently increases and decreases across the threshold value, the economy level image is frequently switched, and there is a possibility that a driver of the own vehicle feels annoyed. As a technique for absorbing frequent increases and decreases in the detection data, it is known that the Kalman filter processing is applied to the detection data (see, for example, Japanese Patent No. 3380497).

When the Kalman filter is applied to the detection data, it is possible to suppress the frequent switching of the economy level image to a certain extent, but when the detection data actually crosses the threshold and repeatedly increases and decreases frequently, the economy level image is switched frequently.

SUMMARY

An object of the present invention is to provide a displaying control apparatus which can suppress the frequent switching of the economy level image.

A displaying control apparatus according to the present invention comprises an electronic control unit which displays an economy level image by a displaying device while the electronic control unit executes a following moving control. The economy level image indicates an economy level showing a level of a low energy consumption to move an own vehicle. The following moving control is a control to autonomously move the own vehicle, allowing a distance between the own vehicle and a preceding vehicle to change within a set inter-vehicle distance range. The electronic control unit is configured to, while the electronic control unit executes the following moving control, acquire a value of at least one environmental parameter which indicates a moving environment of the own vehicle and which defines the economy level, acquire an evaluation value corresponding to the acquired value of the at least one environmental parameter, acquire the economy level based on the acquired evaluation value, and display the economy level image indicating the acquired economy level by the displaying device. In the displaying control apparatus, a first evaluation value which is the evaluation value corresponding to the value of the at least one environmental parameter which is equal to or smaller than a predetermined switching threshold, and a second evaluation value which is the evaluation value corresponding to the value of the at least one environmental parameter which is greater than the predetermined switching threshold, are different values. The electronic control unit is configured to, when the value of the at least one environmental parameter changes from a value equal to or smaller than the predetermined switching threshold to a value greater than the predetermined switching threshold while the electronic control unit executes the following moving control, display the economy level image indicating the economy level acquired based on the first evaluation value by the displaying device until the value of the at least one environmental parameter reaches an increase side threshold greater than the predetermined switching threshold. Further, the electronic control unit is configured to, when the value of the at least one environmental parameter changes from a value greater than the predetermined switching threshold to a value equal to or smaller than the predetermined switching threshold while the electronic control unit executes the following moving control, display the economy level image indicating the economy level acquired based on the second evaluation value by the displaying device until the value of the at least one environmental parameter reaches a decrease side threshold smaller than the predetermined switching threshold.

With the displaying control apparatus according to the present invention, even when the value of the environmental parameter frequently increases or decreases, crossing the predetermined switching threshold while the following moving control is executed, the economy level is acquired based on the evaluation value before the value of the environmental parameter first crosses the predetermined switching threshold, and the economy level image indicating the acquired economy level is displayed. Therefore, frequent switching of the economy level image can be suppressed.

In the displaying control apparatus according to an aspect of the present invention, the electronic control unit may be configured to, when the value of the at least one environmental parameter changes from a value equal to or smaller than the predetermined switching threshold value, exceeds the predetermined switching threshold value, and reaches the increase side threshold while the electronic control unit executes the following moving control, display the economy level image indicating the economy level acquired based on the second evaluation value by the displaying device. In this aspect, the electronic control unit may be configured to, when the value of the at least one environmental parameter changes from a value greater than the predetermined switching threshold value, falls below the predetermined switching threshold value, and reaches the decrease side threshold while the electronic control unit executes the following moving control, display the economy level image indicating the economy level acquired based on the first evaluation value by the displaying device.

With the displaying control apparatus according to this aspect of the present invention, when the value of the environmental parameter exceeds the predetermined switching threshold and reaches the increase side threshold, the economy level image indicating the economy level acquired based on the second evaluation value is displayed. On the other hand, when the value of the environmental parameter falls below the predetermined switching threshold and reaches the decrease side threshold, the economy level image indicating the economy level acquired based on the first evaluation value is displayed. Therefore, when the value of the environmental parameter reaches the increase side threshold or the value of the environmental parameter reaches the decrease side threshold, the economy level image indicating a more accurate economy level is displayed.

In the displaying control apparatus according to another aspect of the present invention, the electronic control unit may be configured to, when the value of the at least one environmental parameter changes from a value equal to or smaller than the predetermined switching threshold to a value greater than the predetermined switching threshold while the electronic control unit executes the following moving control, correct the value of the at least one environmental parameter to a value equal to or smaller than the predetermined switching threshold until the value of the at least one environmental parameter reaches the increase side threshold, and display the economy level image indicating the economy level acquired based on the evaluation value corresponding to the corrected value of the at least one environmental parameter by the displaying device. In this aspect, the electronic control unit may be configured to, when the value of the at least one environmental parameter changes from a value greater than the predetermined switching threshold to a value equal to or smaller than the predetermined switching threshold while the electronic control unit executes the following moving control, correct the value of the at least one environmental parameter to a value greater than the predetermined switching threshold until the value of the at least one environmental parameter reaches the decrease side threshold, and display the economy level image indicating the economy level acquired based on the evaluation value corresponding to the corrected value of the at least one environmental parameter by the displaying device.

With the displaying control apparatus according to the present invention, the frequent switching of the economy level image can be suppressed by a method of correcting the value of the environmental parameter.

In the displaying control apparatus according to further another aspect of the present invention, the electronic control unit may store a first map and a second map for acquiring the evaluation value using the value of the at least one environmental parameter as an argument. In this aspect, the first map may be a map in which (i) the evaluation value corresponding to the value of the at least one environmental parameter which is equal to or smaller than the predetermined switching threshold and (ii) the evaluation value corresponding to the value of the at least one environmental parameter which is greater than the predetermined switching threshold, are set to the same values. Further, the second map may be a map in which (i) the evaluation values corresponding to the value of the at least one environmental parameter equal to or smaller than the predetermined switching threshold and (ii) the evaluation value corresponding to the value of the at least one environmental parameter greater than the predetermined switching threshold are set to different values. In this aspect, the electronic control unit may be configured to, when the value of the at least one environmental parameter changes from a value equal to or smaller than the predetermined switching threshold to a value greater than the predetermined switching threshold while the electronic control unit executes the following moving control, display the economy level image indicating the economy level acquired based on the evaluation value acquired from the first map using the value of the at least one environmental parameter as the argument by the displaying device until the value of the at least one environmental parameter reaches the increase side threshold. Further, the electronic control unit may be configured to, when the value of the at least one environmental parameter changes from a value greater than the predetermined switching threshold to a value equal to or smaller than the predetermined switching threshold while the electronic control unit executes the following moving control, display the economy level image indicating the economy level acquired based on the evaluation value acquired from the first map using the value of the at least one environmental parameter as the argument by the displaying device until the value of the at least one environmental parameter reaches the decrease side threshold.

With the displaying control apparatus according to the present invention, when the value of the environmental parameter changes from a value equal to or smaller than the predetermined switching threshold to a value greater than the predetermined switching threshold while the following moving control is executed, the economy level image does not change until the value of the environmental parameter reaches the increase side threshold. Similarly, when the value of the environmental parameter changes from a value greater than the predetermined switching threshold to a value equal to or smaller than the predetermined switching threshold while the following moving control is executed, the economy level image does not change until the value of the environmental parameter reaches the decrease side threshold. Thus, the frequent switching of the economy level image can be suppressed.

Elements of the invention are not limited to elements of embodiments and modified examples of the invention described with reference to the drawings. The other objects, features and accompanied advantages of the invention can be easily understood from the embodiments and the modified examples of the invention.

BRIEF DESCRIPTION OF THE DRAWINGS

FIG. 4 is a view which shows evaluation values according to an air resistance reduction effect.

FIG. 9 is a view which shows the evaluation values according to the air resistance reduction effect according to a modified example of the embodiment of the present invention.

DETAILED DESCRIPTION

Figure 1:
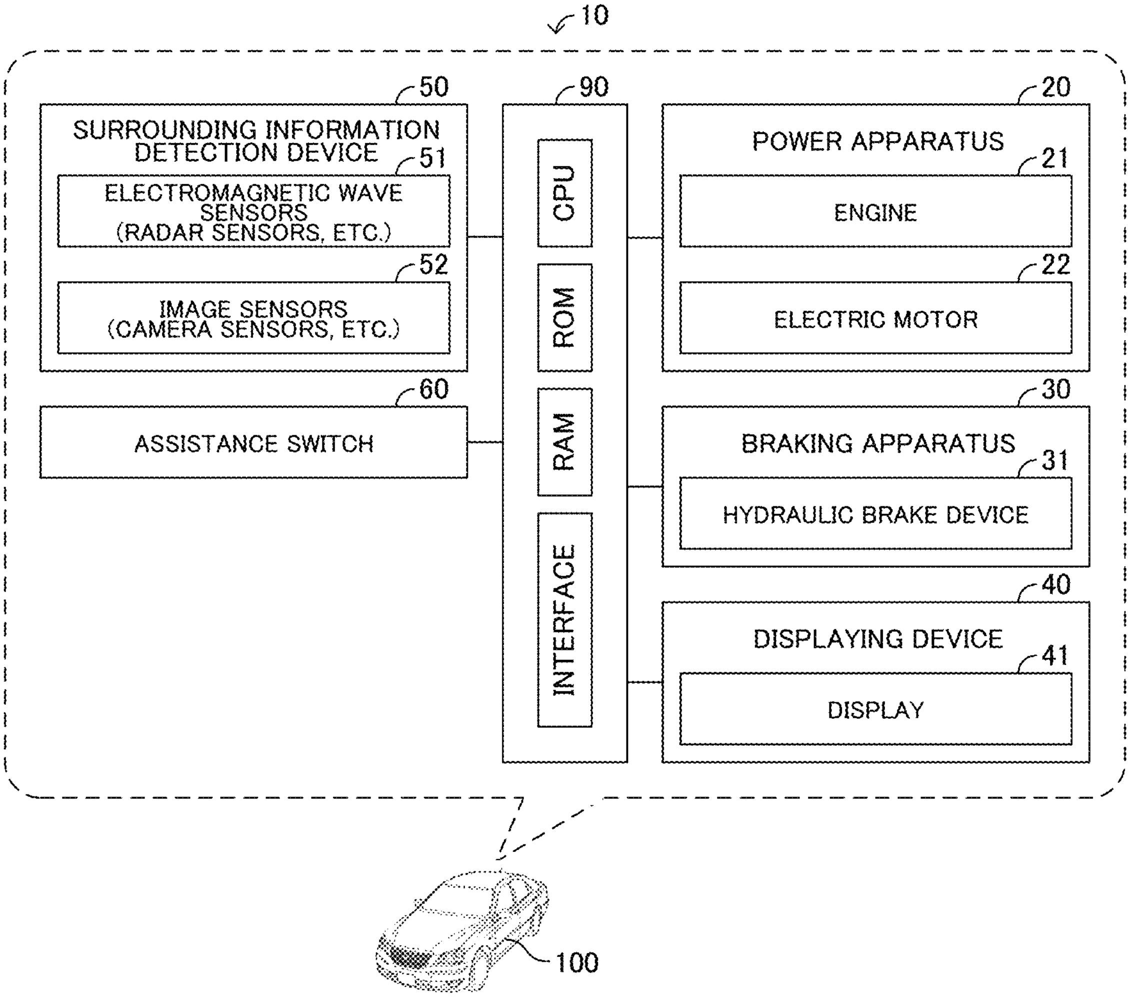
FIG. 1 is a view which shows a vehicle driving assistance apparatus which includes a displaying control apparatus according to an embodiment of the present invention.

Below, a displaying control apparatus according to an embodiment of the present invention will be described with reference to the drawings. FIG. 1 shows the vehicle driving assistance apparatus 10 according to the embodiment of the present invention. A displaying control apparatus according to the embodiment of the present invention is included in the vehicle driving assistance apparatus 10. However, the vehicle driving assistance apparatus 10 and the displaying control apparatus may be configured separately, and some of functions of the vehicle driving assistance apparatus 10 (in particular, a function of controlling an operation of a displaying device described below) may be performed by the displaying control apparatus, while the remaining functions are performed by the vehicle driving assistance apparatus 10.

The vehicle driving assistance apparatus 10 is installed in an own vehicle 100. Hereinafter, the vehicle driving assistance apparatus 10 will be described, using the case where an operator of the own vehicle 100 is a person who rides in the own vehicle 100 and drives the own vehicle 100 (i.e., a driver of the own vehicle 100). However, the operator of the own vehicle 100 may be a person who does not ride in the own vehicle 100 and remotely operates the own vehicle 100 (i.e., a remote operator of the own vehicle 100).

In addition, the present invention can also be applied to vehicles which are driven automatically without a driving operation by the driver or the remote operator. Therefore, when the own vehicle 100 is a vehicle which is moved automatically, a display of results of an overall evaluation using a displaying device described below is performed for occupants who ride in the own vehicle 100 or for remote observers who monitor a moving of the own vehicle 100 at a remote control equipment.

As shown in FIG. 1, the vehicle driving assistance apparatus 10 includes an ECU (electronic control unit) 90 as a control device. The ECU 90 includes a microcomputer as a main component. The microcomputer includes a storage medium including a CPU, a ROM, a RAM, and a non-volatile memory, as well as an interface and other components. The CPU executes instructions, programs, or routines stored in the storage medium to realize various functions. In particular, in this embodiment, the vehicle driving assistance apparatus 10 stores in the storage medium the programs which realize various controls executed by the vehicle driving assistance apparatus 10.

It should be noted that, In this embodiment, the vehicle driving assistance apparatus 10 includes only one ECU 90, but it may be configured to include multiple ECUs and to have each ECU perform the functions of the vehicle driving assistance apparatus 10 described below. Further, the vehicle driving assistance apparatus 10 may also be configured to be able to update the programs stored in the storage medium by wireless communication (e.g., Internet communication) with external devices.

The own vehicle 100 is equipped with a power apparatus 20, a braking apparatus 30, a displaying device 40, a surrounding information detection device 50, and an assistance switch 60.

The power apparatus 20 is an apparatus which generates power applied to the own vehicle 100 (in particular, driven wheels of the own vehicle 100), and in this embodiment, the power apparatus 20 includes an internal combustion engine 21 and at least one electric motor 22. The power apparatus 20 is electrically connected to the ECU 90. The vehicle driving assistance apparatus 10 controls the power applied to the own vehicle 100 by controlling operations of the internal combustion engine 21 and the at least one electric motor 22.

The braking apparatus 30 is an apparatus which applies a braking force to the own vehicle 100 (in particular, wheels of the own vehicle 100), and in this embodiment, the braking apparatus 30 includes a hydraulic brake device 31. The braking apparatus 30 is electrically connected to the ECU 90. The vehicle driving assistance apparatus 10 controls the braking force applied to the own vehicle 100 by controlling an operation of the hydraulic brake device 31.

The displaying device 40 is a device which displays various images to the driver of the own vehicle 100, and in this embodiment, the displaying device 40 includes a display 41. The displaying device 40 is electrically connected to the ECU 90. The vehicle driving assistance apparatus 10 displays various images on the display 41 by the displaying device 40.

The surrounding information detection device 50 is a device which detects information on surroundings of the own vehicle 100, and in this embodiment, the surrounding information detection device 50 includes electromagnetic wave sensors 51 and image sensors 52. The surrounding information detection device 50 is electrically connected to the ECU 90. The electromagnetic wave sensor 51 is, for example, a radar sensor such as a millimeter wave radar. The vehicle driving assistance apparatus 10 acquires information on objects around the own vehicle 100 by the electromagnetic wave sensors 51 as surrounding detection information IS. In addition, the image sensor 52 is, for example, a camera sensor. The vehicle driving assistance apparatus 10 acquires image information on a vicinity of the own vehicle 100 by the image sensor 52 as the surrounding detection information IS.

The assistance switch 60 is a device which is operated by the driver of the own vehicle 100 to request an execution of an economy following moving control described below or to request a stop of the economy following moving control. The assistance switch 60 is electrically connected to the ECU 90. The driver can request the execution of the economy following moving control to the vehicle driving assistance apparatus 10 or request the stop of the economy following moving control to the vehicle driving assistance apparatus 10 by operating the assistance switch 60.

Operation of Vehicle Driving Assistance Apparatus

Next, an operation of the vehicle driving assistance apparatus 10 will be described. The vehicle driving assistance apparatus 10 is configured to execute an economy following moving control when an execution of the economy following moving control is requested. It should be noted that the vehicle driving assistance apparatus 10 is configured to stop executing the economy following moving control when a stop of the execution of the economy following moving control is requested.

Figure 2:
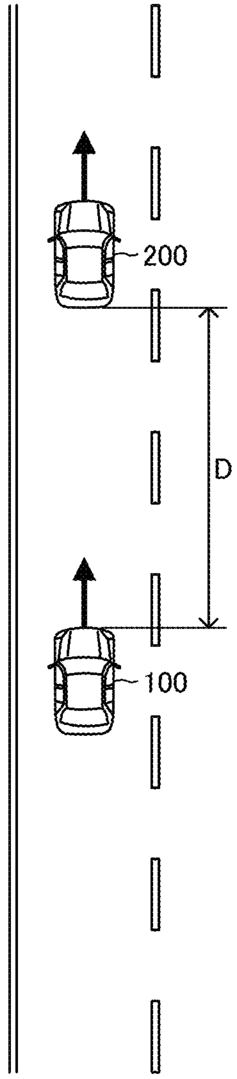
FIG. 2 is a view which shows a scene where a preceding vehicle exists.

The economy following moving control is one of automatic driving controls. As shown in FIG. 2, the economy following moving control is one of the following moving controls which autonomously accelerates and decelerates the own vehicle 100 such that the own vehicle 100 moves, following a preceding vehicle 200 when the preceding vehicle 200 exists. In this embodiment, the economy following moving control includes a coasting mode and a powering mode as control modes.

The coasting mode is a mode which decelerates the own vehicle 100 by disconnecting a connection between the power apparatus 20 and the driven wheels of the own vehicle 100 to cause the own vehicle 100 to coast. The powering mode is a mode which accelerates the own vehicle 100. In particular, the powering mode is an optimal powering mode which powers the own vehicle 100 by operating the power apparatus 20 with an optimal energy efficiency.

When an inter-vehicle distance D (i.e., a distance between the preceding vehicle 200 and the own vehicle 100) decreases and reaches a lower limit value Dlower of a set inter-vehicle distance range Rdset while the economy following moving control is executed in the powering mode, the control mode is switched from the powering mode to the coasting mode. On the other hand, when the inter-vehicle distance D increases and reaches an upper limit value Dupper of the set inter-vehicle distance range Rdset while the economy following moving control is executed in coasting mode, the control mode is switched from the coasting mode to the powering mode.

The set inter-vehicle distance range Rdset is a range of the inter-vehicle distance D where the lower limit value Dlower is set to a set inter-vehicle distance Dset and the upper limit value Dupper is set to a distance which is a predetermined distance AD longer than the set inter-vehicle distance Dset. The set inter-vehicle distance Dset is set in advance by the driver of own vehicle 100. The preceding vehicle 200 is another vehicle which is moving in an own vehicle moving lane (i.e., a lane in which the own vehicle 100 is moving) within a certain distance D200 ahead of the own vehicle 100. The preceding vehicle 200 is detected based on the surrounding detection information IS. The inter-vehicle distance D is acquired based on the surrounding detection information IS.

Figure 3:
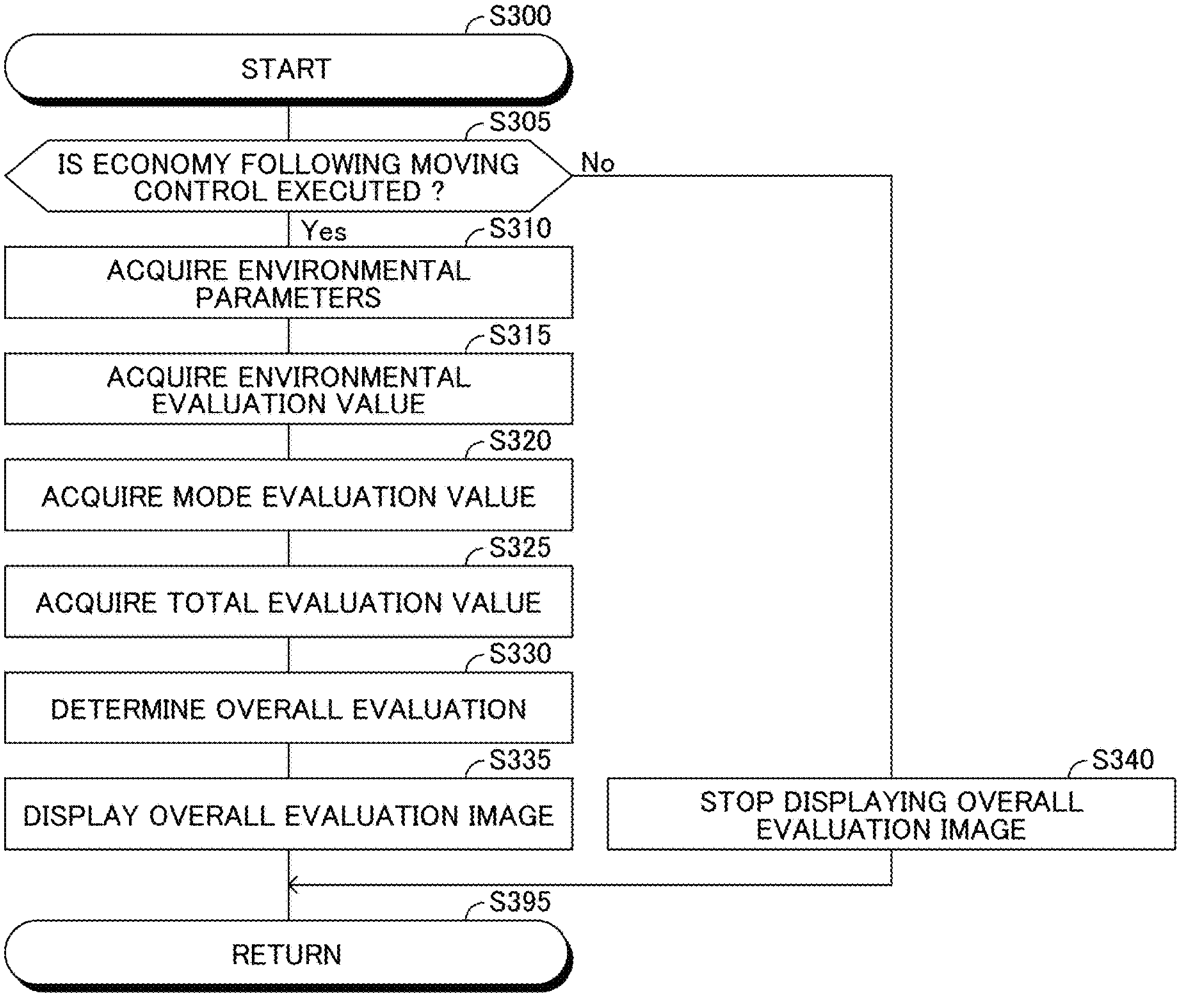
FIG. 3 is a flowchart which shows a routine executed by the vehicle driving assistance apparatus according to the embodiment of the present invention.

In addition, the vehicle driving assistance apparatus 10 is configured to, when a predetermined condition is satisfied, perform an overall evaluation on an economy level achieved by the economy following moving control, and to display a result of that overall evaluation by the displaying device 40 by executing a routine shown in FIG. 3 at a predetermined calculation interval. In other words, the vehicle driving assistance apparatus 10 is configured to display an overall evaluation image T (or an economy level image) indicating the economy level showing a level of a low energy consumption of moving the own vehicle 100 by the displaying device 40 while the economy following moving control is executed. It should be noted that the economy level corresponds to an evaluation value E described below. The economy level increases as the evaluation value E increases.

At a predetermined timing, the vehicle driving assistance apparatus 10 starts processing from a step S300 of the routine shown in FIG. 3, and advances the processing to a step S305 to determine whether or not the economy following moving control is executed.

When the vehicle driving assistance apparatus 10 determines "Yes" at the step S305, the vehicle driving assistance apparatus 10 proceeds to a step S310 and acquires environmental parameters relating to a moving environment of the own vehicle 100. In this embodiment, the environmental parameters are the inter-vehicle distance D and a projected area A. The projected area A is an area of the preceding vehicle 200 projected onto a vertical plane perpendicular to a longitudinal and horizontal line of the preceding vehicle 200 (a line extending horizontally in a longitudinal direction of the preceding vehicle 200). The projected area A is acquired based on the surrounding detection information IS.

The vehicle driving assistance apparatus 10 then proceeds to a step S315 and acquires the evaluation value E (or an environmental evaluation value Ee) relating to an air resistance reduction effect based on the inter-vehicle distance D and the projected area A. The air resistance reduction effect is an effect of reducing an air resistance which the own vehicle 100 receives by executing the economy following moving control. The air resistance reduction effect changes according to the inter-vehicle distance D and the projected area A. In other words, when the own vehicle 100 is moving, following the preceding vehicle 200, the shorter the inter-vehicle distance D, the smaller the air resistance the own vehicle 100 experiences. Also, when the own vehicle 100 is moving, following the preceding vehicle 200, the greater the projected area A of the preceding vehicle 200, the smaller the air resistance the own vehicle 100 experiences. Therefore, the environmental evaluation value Ee tends to increase as the inter-vehicle distance D decreases for the same projected area A. In addition, the environmental evaluation value Ee tends to increase as the projected area A increases for the same inter-vehicle distance D. It should be noted that the smaller the air resistance experienced by the own vehicle 100, the less energy it consumes, and the higher its economy level.

For example, the environmental evaluation value Ee is set for each combination of the inter-vehicle distance D and the projected area A as shown in FIG. 4.

In FIG. 4, reference symbols Rd1 to Rd4 indicate ranges of the inter-vehicle distance D, respectively. The inter-vehicle distance D within the range Rd1 is shorter than the inter-vehicle distance D within the range Rd2. In addition, the inter-vehicle distance D within the range Rd2 is shorter than the inter-vehicle distance D within the range Rd3. In addition, the inter-vehicle distance D within the range Rd3 is shorter than the inter-vehicle distance D within the range Rd4. In addition, the ranges Rd1 and Rd2, the ranges Rd2 and Rd3, and the ranges Rd3 and Rd4 are each continuous ranges.

In this embodiment, when the inter-vehicle distance D is equal to or smaller than an upper limit value DU of the range Rd1, the inter-vehicle distance D is a value within the range Rd1. When the inter-vehicle distance D is greater than the upper limit value DU of the range Rd1 (i.e. it is equal to or greater than a lower limit value DL of the range Rd2) and is equal to or smaller than an upper limit value DU of the range Rd2, the inter-vehicle distance D is a value within the range Rd2. When the inter-vehicle distance D is greater than the upper limit value DU of the range Rd2 (i.e. it is equal to or greater than a lower limit value DL of the range Rd3) and is equal to or smaller than an upper limit value DU of the range Rd3, the inter-vehicle distance D is a value within the range Rd3. When the inter-vehicle distance D is greater than the upper limit value DU of range Rd3 (i.e., it is equal to or greater than a lower limit value DL of the range Rd4), the inter-vehicle distance D is a value within the range Rd4.

In addition, in FIG. 4, reference symbols Ra1 to Ra4 each indicate ranges of the projected area A, respectively. The projected area A within the range Ra1 is smaller than the projected area A within the range Ra2. The projected area A within the range Ra2 is smaller than the projected area A within the range Ra3. The projected area A within range Ra3 is smaller than the projected area A within the range Ra4. The ranges Ra1 and Ra2, the ranges Ra2 and Ra3, and the ranges Ra3 and Ra4 are each continuous ranges.

It should be noted that, in this embodiment, when the projected area A is equal to or smaller than an upper limit AU of the range Ra1, the projected area A is a value within the range Ra1. When the projected area A is greater than the upper limit AU of the range Ra1 (i.e., it is equal to or greater than a lower limit AL of the range Ra2) and is equal to or smaller than an upper limit AU of the range Ra2, the projected area A is a value within the range Ra2. When the projected area A is greater than the upper limit AU of the range Ra2 (i.e. it is equal to or greater than a lower limit AL of the range Ra3) and is equal to or smaller than an upper limit AU of the range Ra3, the projected area A is a value within the range Ra3. When the projected area A is greater than the upper limit AU of the range Ra3 (i.e., it is equal to or greater than a lower limit AL of the range Ra4), the projected area A is a value within the range Ra4.

In an example shown in FIG. 4, when the projected area A is a value within the same range, the environmental evaluation value Ee tends to increase as the inter-vehicle distance D decreases. When the inter-vehicle distance D is within the same range, the environmental evaluation value Ee tends to increase as the projected area A increases. For example, when the inter-vehicle distance D is within the range Rd1, and the projected area A is within the range Ra1, the environmental evaluation value Ee is "1.". As such, the environmental evaluation value Ee is set to a greater value the greater a contribution to reducing the energy consumption associated with the movement of the own vehicle 100.

Next, the vehicle driving assistance apparatus 10 proceeds to a step S320 and acquires the evaluation value E (or a mode evaluation value Em) relating to the control mode. The mode evaluation value Em is set to a greater value when the economy following moving control is executed in the coasting mode than when the economy following moving control is executed in the powering mode.

When the economy following moving control is executed in the coasting mode, the energy consumption relating to the movement of own vehicle 100 is very small. Therefore, in this embodiment, the mode evaluation value Em when the economy following moving control is executed in the coasting mode is set to "3."

When the economy following moving control is executed in the powering mode, energy is consumed in the movement of own vehicle 100. However, an execution of the economy following moving control in the powering mode is essential for executing the economy following moving control in the coasting mode afterwards. Therefore, the execution of the economy following moving control in the powering mode allows the economy following moving control in the coasting mode to be executed afterwards. In other words, the economy following moving control in the powering mode contributes to reducing the energy consumption relating to the movement of own vehicle 100. Therefore, in this embodiment, the mode evaluation value Em is set to "1" when the economy following moving control is executed in the powering mode.

In this way, the mode evaluation value Em is set to a greater value the greater the extent to which it contributes to reducing the energy consumption relating to the movement of own vehicle 100.

Next, the vehicle driving assistance apparatus 10 proceeds to a step S325, and acquires a total evaluation value Et as a total of the environmental evaluation value Ee acquired in the step S315 and the mode evaluation value Em acquired in the step S320.

The vehicle driving assistance apparatus 10 then proceeds to a step S330, and determines an overall evaluation on the economy level which is achieved by the economy following moving control based on the total evaluation value Et. In this embodiment, the overall evaluation is a four-level evaluation (i.e., a first evaluation, a second evaluation, a third evaluation, and a fourth evaluation) from a lowest overall evaluation (or a lowest evaluation) to a highest overall evaluation (or a highest evaluation). When the total evaluation value Et is "1", the overall evaluation is the first evaluation (i.e., the lowest evaluation). When the total evaluation value Et is "2", the overall evaluation is the second evaluation. When the total evaluation value Et is "3", the overall evaluation is the third evaluation. When the total evaluation value Et is "4" or more, the overall evaluation is the fourth evaluation (i.e., the highest evaluation).

The vehicle driving assistance apparatus 10 then proceeds to a step S335 and displays an image indicating the overall evaluation (i.e., an overall evaluation image T) by the displaying device 40. The vehicle driving assistance apparatus 10 then proceeds to a step S395 and ends the processing of this routine. In this embodiment, the overall evaluation image T is an image shown in FIG. 5.

Figure 5:
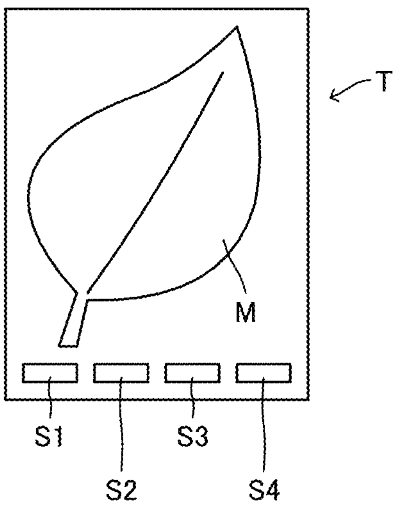
FIG. 5 is a view which shows an overall evaluation image.

The overall evaluation image T shown in FIG. 5 includes a main image M and four sub-images S (namely, a first sub-image S1, a second sub-image S2, a third sub-image S3, and a fourth sub-image S4). The main image M is an image which resembles a single leaf. The sub-images S are bar-shaped images, and the first sub-image S1, the second sub-image S2, the third sub-image S3, and the fourth sub-image S4 are arranged in a row from left to right.

Figure 6:
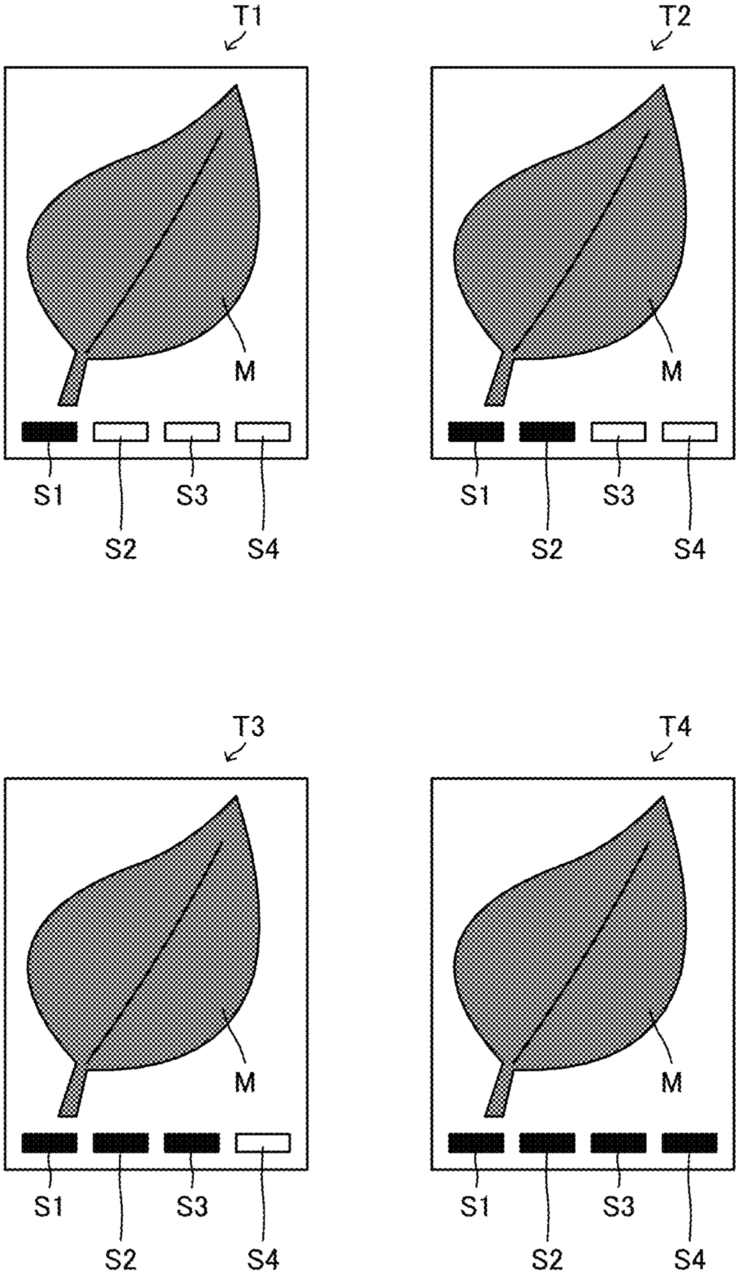
FIG. 6 is a view which shows the overall evaluation images corresponding to a first evaluation (or a lowest evaluation), a second evaluation, a third evaluation, a fourth evaluation, and a fifth evaluation (or a highest evaluation).

As shown in FIG. 6, the overall evaluation image T1 corresponding to the first evaluation is displayed with the main image M and the first sub-image S1 turned on and the second sub-image S2, the third sub-image S3, and the fourth sub-image S4 turned off. The overall evaluation image T2 corresponding to the second evaluation is displayed with the main image M, the first sub-image S1, and the second sub-image S2 turned on, and the third sub-image S3 and the fourth sub-image S4 turned off. The overall evaluation image T3 corresponding to the third evaluation is displayed with the main image M, the first sub-image S1, the second sub-image S2, and the third sub-image S3 turned on, and the fourth sub-image S4 turned off. The overall evaluation image T4 corresponding to the fourth evaluation is displayed with all of the main image M, the first sub-image S1, the second sub-image S2, the third sub-image S3, and the fourth sub-image S4 turned on.

When the vehicle driving assistance apparatus 10 determines "No" at the step S305, the vehicle driving assistance apparatus 10 proceeds to step S340, and when the displaying device 40 is displaying the overall evaluation image T at this point, the vehicle driving assistance apparatus 10 stops displaying the overall evaluation image T. The vehicle driving assistance apparatus 10 then proceeds to the step S395 and ends the processing of this routine.

In this way, while the vehicle driving assistance apparatus 10 executes the economy following moving control, the vehicle driving assistance apparatus 10 (i) acquires the inter-vehicle distance D and the projected area A (i.e., the values of the environmental parameters, which are parameters which define the economy level and indicate the moving environment of the own vehicle 100), (ii) acquires the evaluation value E corresponding to the acquired inter-vehicle distance D and the acquired projected area A, (iii) acquires the total evaluation value Et (i.e., the economy level) based on the acquired evaluation value E, and (iv) display the total evaluation value Et as the overall evaluation image T (i.e., the economy level image) by the displaying device 40.

According to this, the overall evaluation image T is displayed by the displaying device 40. Therefore, the driver of the own vehicle 100 can know the economy level relating to the moving of the own vehicle 100 by looking at the overall evaluation image T.

By the way, the vehicle driving assistance apparatus 10 acquires the environmental evaluation value Ee in accordance with the inter-vehicle distance D and the projected area A. In this regard, for example, when the projected area A is a value within the range Ra3, and the inter-vehicle distance D repeatedly increases and decreases across a boundary between the range Rd1 and the range Rd2, the environmental evaluation value Ee repeatedly fluctuates between "3" and "2." As a result, the overall evaluation image T may change repeatedly, and the driver may feel annoyed by this.

Therefore, the vehicle driving assistance apparatus 10 is configured to use the inter-vehicle distance D acquired by performing a backlash processing on the inter-vehicle distance D acquired based on the surrounding detection information IS to acquire the environmental evaluation value Ee when the inter-vehicle distance D increases and exceeds the upper limit value DU of any of the ranges Rd1 to Rd3, or when the inter-vehicle distance D decreases and falls below the lower limit value DL of any of the ranges Rd2 to Rd4. Similarly, the vehicle driving assistance apparatus 10 is configured to use the projected area A acquired by performing the backlash processing on the projected area A acquired based on the surrounding detection information IS to acquire the environmental evaluation value Ee when the projected area A increases and exceeds the upper limit AU of any of the ranges Ra1 to Ra3, or when the projected area A decreases and falls below the lower limit AL of any of the ranges Ra2 to Ra4.

Figure 7:
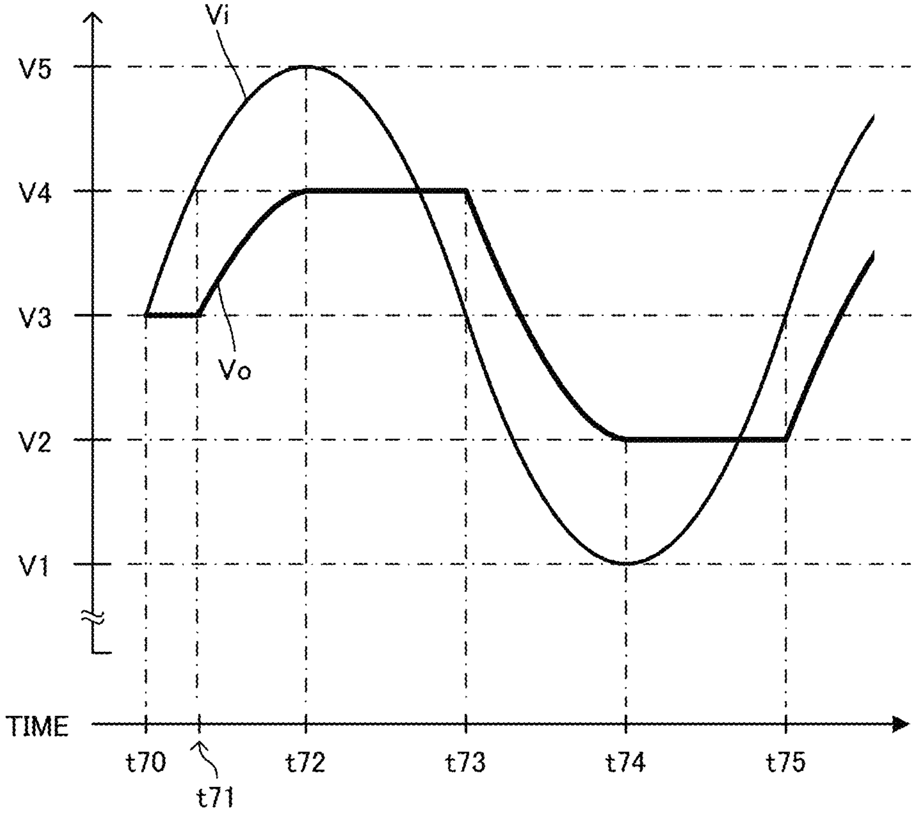
FIG. 7 is a view used for explaining a backlash processing.

The backlash processing is a process to correct an input value Vi (i.e., a value input to the backlash processing) and outputs the corrected value as an output value Vo as shown in FIG. 7. In other words, when the backlash processing for the input value Vi is started when the input value Vi increases to reach a third value V3 (time t70), the output value Vo is maintained at the third value V3 until the input value Vi increases to reach a fourth value V4 (time t71). Then, when the input value Vi reaches the fourth value V4, the output value Vo begins to increase, and thereafter, the output value Vo increases as the input value Vi increases. At this time, the output value Vo is a value which is smaller than the input value Vi by a difference between the fourth value V4 and the third value V3 (Vo=Vi−(V4−V3)).

After that, when the input value Vi reaches a fifth value V5 and the output value Vo reaches the fourth value V4 (time t72), the input value Vi begins to decrease, and the output value Vo is maintained at the fourth value V4 until the input value Vi reaches the third value V3 (time t73). After that, when the input value Vi reaches the third value V3, the output value Vo begins to decrease, and then the output value Vo decreases as the input value Vi decreases. At this time, the output value Vo is a value which is smaller than the input value Vi by the difference between the fourth value V4 and the third value V3 (Vo=Vi−(V4−V3)).

After that, when the input value Vi reaches the first value V1 and the output value Vo reaches the second value V2 (time t74), the input value Vi starts to increase, and the output value Vo is maintained at the second value V2 until the input value Vi reaches the third value V3 (time t75). After that, when the input value Vi reaches the third value V3, the output value Vo begins to increase, and then the output value Vo increases as the input value Vi increases. At this time, the output value Vo is a value which is smaller than the input value Vi by the difference between the fourth value V4 and the third value V3 (Vo=Vi−(V4−V3)).

In this way, when the backlash processing starts when the input value Vi increases and reaches the third value V3, the output value Vo is maintained at the third value V3 as long as the input value Vi fluctuates between the fourth value V4 and the second value V2.

It should be noted that when the backlash processing for the input value Vi is started when the input value Vi decreases and reaches the third value V3, the input value Vi is corrected such that the output value Vo is maintained at the third value V3 as long as the input value Vi fluctuates between the fourth value V4 and the second value V2, and the corrected value is output as the output value Vo by the backlash processing.

Figure 8:
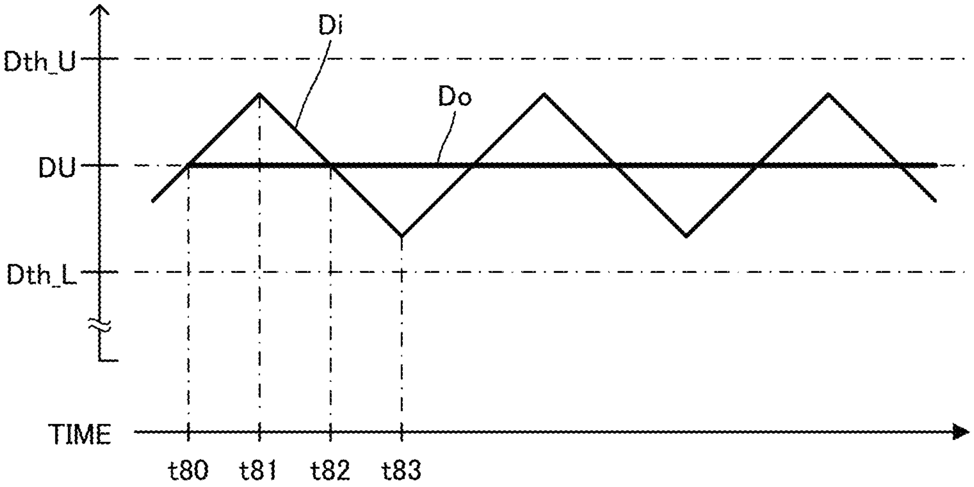
FIG. 8 is a view which shows a change of an inter-vehicle distance after the backlash processing.

Therefore, when an input inter-vehicle distance Di changes as shown in FIG. 8, an output inter-vehicle distance Do is maintained at the upper limit value DU of the range Rd1. The input inter-vehicle distance Di is the inter-vehicle distance D acquired by the vehicle driving assistance apparatus 10 based on the surrounding detection information IS. The output inter-vehicle distance Do is the inter-vehicle distance D output by the backlash processing.

FIG. 8 shows an example of how the input inter-vehicle distance Di varies when the projected area A is a value within the range Ra3. That is, in the example shown in FIG. 8, the input inter-vehicle distance Di increases and reaches the upper limit value DU of the range Rd1 (time t80). After that, the input inter-vehicle distance Di continues to increase and then starts to decrease before exceeding an increase side inter-vehicle distance Dth_U (time t81). The increase side inter-vehicle distance Dth_U corresponds to the fourth value V4 in the example shown in FIG. 7. After that, the input inter-vehicle distance Di reaches the upper limit value DU of the range Rd1 (time t82), and continues to decrease and then starts to decrease before falling below a decrease side inter-vehicle distance Dth_L (time t83). The decrease side inter-vehicle distance Dth_L corresponds to the second value V2 in the example shown in FIG. 7. This increase and decrease is repeated. In the example shown in FIG. 8, when the input inter-vehicle distance Di increases and reaches the upper limit value DU of the range Rd1 (time t80), the backlash processing for the input inter-vehicle distance Di is started.

According to this, while the input inter-vehicle distance Di is increasing or decreasing across the upper limit value DU of the range Rd1, the output inter-vehicle distance Do is maintained at the upper limit value DU of the range Rd1. Therefore, the environmental evaluation value Ee is maintained at the evaluation value E corresponding to the inter-vehicle distance D being a value within the range Rd1. Thus, a range between the increase side inter-vehicle distance Dth_U and the decrease side inter-vehicle distance Dth_L is a dead zone for the input inter-vehicle distance Di.

In this embodiment, for example, when the inter-vehicle distance D (i.e., the value of the environmental parameter) changes from a value equal to or smaller than the upper limit value DU (i.e., a predetermined switching threshold) of the range Rd1 to a value greater than said upper limit value DU while the economy following moving control is executed, the vehicle driving assistance apparatus 10 corrects the inter-vehicle distance D to the upper limit value DU of the range Rd1 until the inter-vehicle distance D reaches the increase side inter-vehicle distance Dth_U (i.e., an increase side threshold), and displays the overall evaluation image T (i.e., an economy level image) indicating the total evaluation value Et (i.e., an economy level) acquired based on the evaluation value E corresponding to the corrected inter-vehicle distance D by the displaying device 40. Further, when the inter-vehicle distance D changes from a value greater than the upper limit value DU of range Rd1 to a value equal to or smaller than said upper limit value DU while the economy following moving control is executed, the vehicle driving assistance apparatus 10 corrects the inter-vehicle distance D to a value greater than the upper limit value DU of the range Rd1 until the inter-vehicle distance D reaches the decrease side inter-vehicle distance Dth_L (i.e., a decrease side threshold), and displays the overall evaluation image T indicating the total evaluation value Et acquired based on the evaluation value E corresponding to the corrected inter-vehicle distance D by the displaying device 40.

It should be noted that the backlash processing may be configured to correct the inter-vehicle distance D to a value within the range Rd1 which is smaller than the upper limit value DU of the range Rd1 until the inter-vehicle distance D reaches the increase side inter-vehicle distance Dth_U, for example, when the inter-vehicle distance D changes from a value which is equal to or smaller than the upper limit value DU of the range Rd1 to a value which is greater than the upper limit value DU of the range Rd1 while the economy following moving control is executed. Similarly, the backlash processing may be configured to correct the inter-vehicle distance D to a value greater than the upper limit value DU of the range Rd1 until the inter-vehicle distance D reaches the decrease side inter-vehicle distance Dth_L (i.e., a decrease side threshold), for example, when the inter-vehicle distance D changes from a value greater than the upper limit value DU of the range Rd1 to a value equal to or smaller than said upper limit value DU while the economy following moving control is executed. In this embodiment, for example, the evaluation value E (i.e., a first evaluation value) corresponding to the inter-vehicle distance D (i.e., a value of the environmental parameter) which is equal to or smaller than the upper limit value DU (i.e., a predetermined switching threshold) of the range Rd1 and the evaluation value E (i.e., a second evaluation value) corresponding to the inter-vehicle distance D which is greater than the upper limit value DU of the range Rd1 are different from each other. In addition, when the inter-vehicle distance D changes from a value equal to or smaller than the upper limit value DU of range Rd1 to a value greater than said upper limit value DU while the following moving control is executed, the vehicle driving assistance apparatus 10 displays, by the displaying device 40, the overall evaluation image T (i.e., the economy level image) indicating the economy level acquired based on the evaluation value E (i.e., the first evaluation value) corresponding to the inter-vehicle distance D which is equal to or smaller than the upper limit value DU of range Rd1 until the inter-vehicle distance D reaches the increase side inter-vehicle distance Dth_U (i.e., the increase side threshold) which is a value greater than the upper limit value DU of range Rd1. Further, when the inter-vehicle distance D changes from a value which is greater than the upper limit value DU of the range Rd1 to a value which is equal to or smaller than said upper limit value DU while the following moving control is executed, the vehicle driving assistance apparatus 10 displays, by the displaying device 40, the overall evaluation image T indicating the economy level acquired based on the evaluation value E (i.e., the second evaluation value) corresponding to the inter-vehicle distance D which is greater than the upper limit value DU of the range Rd1 until the inter-vehicle distance D reaches the decrease side inter-vehicle distance Dth_L (i.e., a decrease side threshold) which is smaller than the upper limit value DU of the range Rd1.

Accordingly, even when the inter-vehicle distance D frequently increases and decreases while crossing the upper limit value DU of the range Rd1 while the economy following moving control is executed, the total evaluation value Et is acquired based on the evaluation value E before the inter-vehicle distance D first crosses the upper limit value DU of the range Rd1, and the overall evaluation image T indicating the acquired total evaluation value Et is displayed. As a result, frequent switching of the overall evaluation image T can be suppressed.

It should be noted that the present invention is not limited to the above embodiments, and various modified examples can be adopted within the scope of the present invention.

Modified Example

For example, instead of acquiring the environmental evaluation value Ee based on the inter-vehicle distance D and the projected area A with backlash processing, the vehicle driving assistance apparatus 10 may be configured to acquire the environmental evaluation value Ee based on two maps (or an increase direction map MapU and a decrease direction map MapD) for acquiring the environmental evaluation value Ee with the inter-vehicle distance D and the projected area A (i.e., the values of environmental parameters) as arguments as shown in FIG. 9.

The vehicle driving assistance apparatus 10 acquires the environmental evaluation value Ee from the increase direction map MapU and the decrease direction map MapD, respectively when the inter-vehicle distance D increases, exceeds the upper limit value DU of the range Rd1, and becomes a value within the range Rd2, respectively in a situation where the projected area A is a value within the range Ra3. In this case, the environmental evaluation value Ee acquired from the increase direction map MapU is "3", and the environmental evaluation value Ee acquired from the decrease direction map MapD is "2." Here, the vehicle driving assistance apparatus 10 adopts the environmental evaluation value Ee which has the smaller difference with the environmental evaluation value Ee corresponding to the inter-vehicle distance D being a value within the range Rd1 as the environmental evaluation value Ee at that time. In this embodiment, the environmental evaluation value Ee corresponding to the inter-vehicle distance D being a value within the range Rd1 is "3." Therefore, the vehicle driving assistance apparatus 10 adopts the environmental evaluation value Ee ("3") acquired from the increase direction map MapU as the environmental evaluation value Ee at that time.

On the other hand, when the inter-vehicle distance D decreases, falls below the lower limit value DL of the range Rd3, and becomes a value within the range Rd2, the vehicle driving assistance apparatus 10 acquires the environmental evaluation value Ee from the increasing direction map MapU and the decreasing direction map MapD, respectively in the situation where the projected area A is a value within the range Ra3. In this case, the environmental evaluation value Ee acquired from the increase direction map MapU is "3", and the environmental evaluation value Ee acquired from the decrease direction map MapD is "2." As mentioned above, the vehicle driving assistance apparatus 10 adopts the environmental evaluation value Ee which has the smaller difference with the environmental evaluation value Ee corresponding to the inter-vehicle distance D being a value within the range Rd1 as the environmental evaluation value Ee at that time. In this embodiment, the environmental evaluation value Ee corresponding to the inter-vehicle distance D being within the range Rd3 is "2." Therefore, the vehicle driving assistance apparatus 10 adopts the environmental evaluation value Ee ("2") acquired from the decrease direction map MapD as the environmental evaluation value Ee at that time.

In this way, the increase direction map MapU is a map (i.e., a first map) in which the evaluation value E corresponding to the inter-vehicle distance D (i.e., the value of the environmental parameter) which is equal to or smaller than the upper limit value DU (i.e. the predetermined switching threshold) of the range Rd1 and the evaluation value E corresponding to the inter-vehicle distance D which is greater than the upper limit value DU of the range Rd1 are set to the same values, in a situation where the projected area A is a value within the range Ra3. In addition, the decreasing direction map MapD is a map (i.e., the first map) in which the evaluation value E corresponding to the inter-vehicle distance D which is equal to or smaller than the upper limit value DU (i.e., the predetermined switching threshold) of the range Rd2 and the evaluation value E corresponding to the inter-vehicle distance D which is greater than the upper limit value DU of the range Rd2 are set to the same values, in a situation where the projected area A is a value within the range Ra3.

On the other hand, the increase direction map MapU is a map (i.e., a second map) in which the evaluation value E corresponding to the inter-vehicle distance D (i.e., the value of the environmental parameter) which is equal to or smaller than the upper limit value DU (i.e., the predetermined switching threshold) of range Rd2 and the evaluation value E corresponding to the inter-vehicle distance D which is greater than the upper limit value DU of range Rd2 are set to different values, in a situation where the projected area A is a value within range Ra3. In addition, the decreasing direction map MapD is a map (i.e., the second map) in which the evaluation value E corresponding to the inter-vehicle distance D which is equal to or smaller than the upper limit value DU (i.e., the predetermined switching threshold) of the range Rd1 and the evaluation value E corresponding to the inter-vehicle distance D which is greater than the upper limit value DU of the range Rd1 are set to different values, in a situation where the projected area A is a value within the range Ra3.

Thereby, the frequent switching of the overall evaluation image T can be suppressed.

What is claimed is:

1. A displaying control apparatus comprising an electronic control unit which displays an economy level image by a displaying device while the electronic control unit executes a following moving control, the economy level image indicating an economy level showing a level of a low energy consumption to move an own vehicle, the following moving control being a control to autonomously move the own vehicle, allowing a distance between the own vehicle and a preceding vehicle to change within a set inter-vehicle distance range, and the electronic control unit being configured to:

while the electronic control unit executes the following moving control, acquire a value of at least one environmental parameter which indicates a moving environment of the own vehicle and which defines the economy level;

acquire an evaluation value corresponding to the acquired value of the at least one environmental parameter;

acquire the economy level based on the acquired evaluation value; and display the economy level image indicating the acquired economy level by the displaying device, wherein a first evaluation value which is the evaluation value corresponding to the value of the at least one environmental parameter which is equal to or smaller than a predetermined switching threshold, and a second evaluation value which is the evaluation value corresponding to the value of the at least one environmental parameter which is greater than the predetermined switching threshold, are different values, and the electronic control unit is configured to:

when the value of the at least one environmental parameter changes from a value equal to or smaller than the predetermined switching threshold to a value greater than the predetermined switching threshold while the electronic control unit executes the following moving control, display the economy level image indicating the economy level acquired based on the first evaluation value by the displaying device until the value of the at least one environmental parameter reaches an increase side threshold greater than the predetermined switching threshold; and when the value of the at least one environmental parameter changes from a value greater than the predetermined switching threshold to a value equal to or smaller than the predetermined switching threshold while the electronic control unit executes the following moving control, display the economy level image indicating the economy level acquired based on the second evaluation value by the displaying device until the value of the at least one environmental parameter reaches a decrease side threshold smaller than the predetermined switching threshold, wherein the predetermined switching threshold is a boundary value that separates a range of the value of the at least one environmental parameter corresponding to the first evaluation value from a range of the value of the at least one environmental parameter corresponding to the second evaluation value, and wherein the increase side threshold and the decrease side threshold are set separately from the predetermined switching threshold with the predetermined switching threshold as a reference such that the increase side threshold is greater than the predetermined switching threshold and the decrease side threshold is smaller than the predetermined switching threshold.

2. The displaying control apparatus according to claim 1, wherein the electronic control unit is configured to:

when the value of the at least one environmental parameter changes from a value equal to or smaller than the predetermined switching threshold, exceeds the predetermined switching threshold, and reaches the increase side threshold while the electronic control unit executes the following moving control, display the economy level image indicating the economy level acquired based on the second evaluation value by the displaying device; and when the value of the at least one environmental parameter changes from a value greater than the predetermined switching threshold, falls below the predetermined switching threshold, and reaches the decrease side threshold while the electronic control unit executes the following moving control, display the economy level image indicating the economy level acquired based on the first evaluation value by the displaying device.

3. The displaying control apparatus according to claim 1, wherein the electronic control unit is configured to:

when the value of the at least one environmental parameter changes from a value equal to or smaller than the predetermined switching threshold to a value greater than the predetermined switching threshold while the electronic control unit executes the following moving control, correct the value of the at least one environmental parameter to a value equal to or smaller than the predetermined switching threshold until the value of the at least one environmental parameter reaches the increase side threshold, and display the economy level image indicating the economy level acquired based on the evaluation value corresponding to the corrected value of the at least one environmental parameter by the displaying device; and when the value of the at least one environmental parameter changes from a value greater than the predetermined switching threshold to a value equal to or smaller than the predetermined switching threshold while the electronic control unit executes the following moving control, correct the value of the at least one environmental parameter to a value greater than the predetermined switching threshold until the value of the at least one environmental parameter reaches the decrease side threshold, and display the economy level image indicating the economy level acquired based on the evaluation value corresponding to the corrected value of the at least one environmental parameter by the displaying device.

4. The displaying control apparatus according to claim 1, wherein the electronic control unit stores a first map and a second map for acquiring the evaluation value using the value of the at least one environmental parameter as an argument, the first map is a map in which (i) the evaluation value corresponding to the value of the at least one environmental parameter which is equal to or smaller than the predetermined switching threshold and (ii) the evaluation value corresponding to the value of the at least one environmental parameter which is greater than the predetermined switching threshold, are set to the same values, the second map is a map in which (i) the evaluation values corresponding to the value of the at least one environmental parameter equal to or smaller than the predetermined switching threshold and (ii) the evaluation value corresponding to the value of the at least one environmental parameter greater than the predetermined switching threshold are set to different values, and the electronic control unit is configured to:

when the value of the at least one environmental parameter changes from a value equal to or smaller than the predetermined switching threshold to a value greater than the predetermined switching threshold while the electronic control unit executes the following moving control, display the economy level image indicating the economy level acquired based on the evaluation value acquired from the first map using the value of the at least one environmental parameter as the argument by the displaying device until the value of the at least one environmental parameter reaches the increase side threshold; and when the value of the at least one environmental parameter changes from a value greater than the predetermined switching threshold to a value equal to or smaller than the predetermined switching threshold while the electronic control unit executes the following moving control, display the economy level image indicating the economy level acquired based on the evaluation value acquired from the first map using the value of the at least one environmental parameter as the argument by the displaying device until the value of the at least one environmental parameter reaches the decrease side threshold.

* * * * *